United States Patent
Furukawa et al.

(10) Patent No.: US 8,953,208 B2
(45) Date of Patent: Feb. 10, 2015

(54) COOPERATIVE IMAGE PROCESSING SYSTEM, COOPERATION METHOD, PORTABLE TERMINAL APPARATUS, AND RECORDING MEDIUM

(71) Applicant: Konica Minolta, Inc., Tokyo (JP)

(72) Inventors: Manabu Furukawa, Kyoto (JP); Masaya Hashimoto, Hyogo (JP); Junichi Hase, Osaka (JP); Nobuhiro Mishima, Osaka (JP); Akihiro Torigoshi, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/052,544

(22) Filed: Oct. 11, 2013

(65) Prior Publication Data

US 2014/0104649 A1     Apr. 17, 2014

(30) Foreign Application Priority Data

Oct. 15, 2012   (JP) .................................. 2012-228474

(51) Int. Cl.
   *H04N 1/00*   (2006.01)

(52) U.S. Cl.
   CPC .................................. *H04N 1/00307* (2013.01)
   USPC ........ 358/1.15; 358/1.13; 358/1.16; 709/201; 709/220

(58) Field of Classification Search
   None
   See application file for complete search history.

(56) References Cited

U.S. PATENT DOCUMENTS

| 7,188,311 | B2 * | 3/2007 | Tanaka et al. ................... 715/248 |
| 7,667,862 | B2 * | 2/2010 | Ziegler et al. ................. 358/1.13 |
| 7,672,002 | B2 * | 3/2010 | Ziegler et al. ................. 358/1.13 |
| 2008/0231869 | A1 * | 9/2008 | Morimoto ....................... 358/1.1 |
| 2011/0181900 | A1 * | 7/2011 | Suese ........................... 358/1.13 |

FOREIGN PATENT DOCUMENTS

JP       H05122424 A       5/1993

(Continued)

OTHER PUBLICATIONS

Patent Abstracts of Japan, Publication No. JP2011118586 dated Jun. 16, 2011 (1 page).
Patent Abstracts of Japan, Publication No. JP2004192162 dated Jul. 8, 2004 (1 page).

(Continued)

*Primary Examiner* — Ashish K Thomas
(74) *Attorney, Agent, or Firm* — Osha Liang LLP

(57) ABSTRACT

A cooperative system comprises an image processing apparatus and a portable terminal; the image processing apparatus comprises: a display; a judgment portion judging whether an operation screen requested from the portable terminal apparatus is a first screen including a file area or a second screen including no file area; and a transmitter transmitting screen data for reproducing the first or second screen depending on the judgment result, along with a file and area reproduction information; the portable terminal comprises: a requestor requesting for the screen data; a reproducer reproducing the first or second screen; a display displaying the first or second screen; a judgment portion judging whether user operates on the file area or the other area; and a controller showing in the file area an appropriate portion of the file for user operation if user operates on the file area.

18 Claims, 8 Drawing Sheets

(56) References Cited

FOREIGN PATENT DOCUMENTS

| | | |
|---|---|---|
| JP | 2004-140420 A | 5/2004 |
| JP | 2004-192162 A | 7/2004 |
| JP | 2006163794 A | 6/2006 |
| JP | 2006-237705 A | 9/2006 |
| JP | 2007233942 A | 9/2007 |
| JP | 2011-118586 A | 6/2011 |
| JP | 2011124914 A | 6/2011 |

OTHER PUBLICATIONS

Patent Abstracts of Japan, Publication No. JP2006237705 dated Sep. 7, 2006 (1 page).

Patent Abstracts of Japan, Publication No. JP2004140420 dated May 13, 2004 (1 page).

Office Action issued in corresponding Japanese Application No. 2012-228474 dated Oct. 14, 2014, and English translation thereof (5 pages).

* cited by examiner

COOPERATIVE IMAGE PROCESSING SYSTEM, COOPERATION METHOD, PORTABLE TERMINAL APPARATUS, AND RECORDING MEDIUM

This application claims priority under 35 U.S.C. §119 to Japanese Patent Application No. 2012-228474 filed on Oct. 15, 2012, the entire disclosure of which is incorporated herein by reference in its entirety.

BACKGROUND OF THE INVENTION

1. Field of the Invention

The present invention relates to a cooperative image processing system including an image processing apparatus such as a multi-function peripheral (MFP), i.e., a multifunctional digital machine, and a portable terminal apparatus such as a smartphone or a tablet computer terminal that is capable of accessing the image processing apparatus; a cooperation method for the cooperative image processing system; the portable terminal apparatus; and a recording medium storing a cooperation program.

2. Description of the Related Art

The following description sets forth the inventor's knowledge of related art and problems therein and should not be construed as an admission of knowledge in the prior art.

In recent years, users can store digital documents on their portable information apparatuses such as smartphones and tablet computer terminals, and even view and edit the stored documents anytime and anywhere they like. After editing a document by the portable terminal apparatus, users can transmit the document to an image processing apparatus such as a MFP to have it printed out by or stored on the image processing apparatus. Users also can create a file consisting of image data, for example, by scanning a physical paper document with a scanner of the image processing apparatus, transmit it to their portable information apparatuses to edit the file thereby.

However, users are bothered by operating different screens from the image processing apparatus and the portable information apparatus, back and forth separately, which is quite troublesome.

To solve this problem, there has only recently been proposed a cooperative system including an image processing apparatus and a portable terminal apparatus, which allows a user to access functions of the image processing apparatus from the portable terminal apparatus, by displaying an operation screen of the image processing apparatus to operate the image processing apparatus, on a display portion of the portable terminal apparatus. In such a cooperative system, a portable terminal apparatus displays operation screens of an image processing apparatus on its display portion on the basis of display data received from the image processing apparatus.

In such a cooperative system, a portable terminal apparatus may display an operation screen of an image processing apparatus, which includes an area for a preview of an image file stored on the image processing apparatus. This configuration serves the convenience of users because they can see in details an image file stored on the image processing apparatus, from the display portion of the portable terminal apparatus which is larger than an operation panel of the image processing apparatus.

This configuration also has a problem as described below, specifically when a user operates on a preview of an image file stored on the image processing apparatus, from the display portion of the portable terminal apparatus.

As mentioned previously, the portable terminal apparatus displays operation screens of the image processing apparatus on its display portion on the basis of display data received from the image processing apparatus. That is, when a user operates on a preview from the portable terminal apparatus, the portable terminal apparatus transmits operation information indicating the user operation to the image processing apparatus; receiving this operation information, the image processing apparatus generates next operation screen and transmits screen data for reproducing the operation screen, to the portable terminal apparatus; on the basis of the display data, the portable terminal apparatus reproduces and displays the next operation screen on its display portion.

Specifically, for example, when a user flips to the next page on a preview of an image file in a file display area of an operation screen, it is necessary for the image processing apparatus to: call out the image file from its storage; generate another operation screen including the next page of the image file; and transmits screen data for reproducing the next operation screen to the portable terminal apparatus. It takes a certain period of time for the image processing apparatus to generate display data for reproducing an operation screen, and thus the user has to be bothered by waiting for a while until he/she can see a preview of the next page on the portable terminal apparatus, which is quite troublesome.

The image processing apparatus transmits display data in a compressed form to the portable terminal apparatus and the portable terminal apparatus decompresses it to display, and thus an operation screen is poorly reproduced on the basis of the display data degraded by compression and decompression; as a result, the user cannot see a high-quality preview of the next page in a small file display area of the next operation screen, which is also troublesome.

It is the image processing apparatus generates that generates display data for reproducing an operation screen at every user operation, and the functions of the image processing apparatus determine operations allowed on the preview from the portable terminal apparatus, and thus, users possibly may not be able to use a common file-handling function that is enabled by an application installed on the portable terminal apparatus, such as "pinching". That is also troublesome.

Disclosed in Japanese Unexamined Patent Publication No. 2011-118586 is a portable terminal that is configured to display a preview of a document in a similar size to a physical copy of the same to be printed in accordance with a preferred print option by a preferred printer among a plurality of printers each connected to the portable terminal via a network.

Specifically, when a user selects a document, a printer, and a print setting (paper size, resolution, and the like) by operating the portable terminal, a server calculates a pixel on the basis of the print setting and creates a print image having the calculated pixel from the document. Meanwhile the server also obtains information of a display portion of the portable terminal (horizontal pixel count, vertical pixel count, and resolution). The server further calculates a pixel count for a preview of the print image on the basis of the pixel count of the print image and the resolution of the display portion; generates a preview of the print image having the calculated pixel count; and transmits the preview to the portable terminal.

Actually, Japanese Unexamined Patent Publication No. 2011-118586 relates to a technique of allowing a server to generate a preview and transmit it to a portable terminal apparatus but never relates to a technique of allowing users to operate on a preview in a file display area of an operation screen of an image forming apparatus, which is displayed on their portable terminal apparatuses. That is, the patent document does not provide a solution to the problems laid out above, which occur when a user operates on a preview in a file display area of an operation screen of the image forming apparatus, which is displayed on his/her portable terminal apparatus.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to A cooperative image processing system comprising an image processing apparatus and a portable terminal apparatus being capable of accessing to each other, the image processing apparatus comprising:
a display portion;
a screen judgment portion that judges whether an operation screen requested from the portable terminal apparatus is a first operation screen including a file display area that shows the entire or a portion of a file or a second operation screen including no file display area, when the image processing apparatus receives a request for screen data for reproducing the operation screen, from the portable terminal apparatus; and
a transmitter that transmits the screen data for reproducing the first operation screen, but excluding the file display area, to the portable terminal apparatus along with the file and area reproduction information for reproducing the file display area so that the portable terminal apparatus can reproduce the file display area on the basis of the file, if the screen judgment portion judges that the operation screen requested from the portable terminal apparatus is the first operation screen; or transmits the screen data for reproducing the second operation screen to the portable terminal apparatus, if the screen judgment portion judges that the operation screen requested from the portable terminal apparatus is the second operation screen,
the portable terminal apparatus comprising:
a request transmitter that transmits a request for the screen data for reproducing the first or second operation screen to the image processing apparatus;
an operation screen reproducer that reproduces the first operation screen of the image processing apparatus on the basis of the screen data for reproducing the first operation screen and the area reproduction information for reproducing the file display area, if the portable terminal apparatus receives the screen data for reproducing the first operation screen from the image processing apparatus in return to the request; or reproduces the second operation screen of the image processing apparatus on the basis of the screen data for reproducing the second operation screen, if the portable terminal apparatus receives the screen data for reproducing the second operation screen from the image processing apparatus in return to the request;
a terminal display portion that displays the first or second operation screen reproduced by the operation screen reproducer;
a file storage that stores the file received from the image processing apparatus;
an operation judgment portion that judges whether a user operates on the first or second operation screen displayed on the terminal display portion;
a notification transmitter that transmits operation information indicating the user operation to the image processing apparatus if the operation judgment portion judges that a user operates on the second operation screen or the area other than the file display area in the first operation screen; and
a display controller that allows the terminal display portion to show a target portion of the file stored on the file storage, the target portion being appropriate for the user operation, in the file display area if the operation judgment portion judges that a user operates on the file display area in the first operation screen.

A second aspect of the present invention relates to a cooperation method to be implemented by a cooperative image processing system comprising an image processing apparatus and a portable terminal apparatus being capable of accessing to each other, the cooperation method comprising:
the following steps of the image processing apparatus:
judging whether an operation screen requested from the portable terminal apparatus is a first operation screen including a file display area that shows the entire or a portion of a file or a second operation screen including no file display area, when the image processing apparatus receives a request for screen data for reproducing the operation screen, from the portable terminal apparatus; and
transmitting the screen data for reproducing the first operation screen, but excluding the file display area, to the portable terminal apparatus along with the file and area reproduction information for reproducing the file display area so that the portable terminal apparatus can reproduce the file display area on the basis of the file, if the operation screen requested from the portable terminal apparatus is the first operation screen; or transmitting the screen data for reproducing the second operation screen to the portable terminal apparatus, if the operation screen requested from the portable terminal apparatus is the second operation screen; and
the following steps of the portable terminal apparatus:
transmitting a request for the screen data for reproducing the first or second operation screen to the image processing apparatus;
reproducing the first operation screen of the image processing apparatus on the basis of the screen data for reproducing the first operation screen and the area reproduction information for reproducing the file display area, if the portable terminal apparatus receives in return to the request the screen data for reproducing the first operation screen from the image processing apparatus; or reproducing the second operation screen of the image processing apparatus on the basis of the screen data for reproducing the second operation screen, if the portable terminal apparatus receives in return to the request the screen data for reproducing the second operation screen from the image processing apparatus;
displaying the first or second operation screen reproduced by the operation screen reproducer, on a terminal display portion of the portable terminal apparatus;
storing the file received from the image processing apparatus;
judging whether a user operates on the first or second operation screen displayed on the terminal display portion;

transmitting operation information indicating the user operation to the image processing apparatus if a user operates on the second operation screen or the area other than the file display area in the first operation screen; and allowing the terminal display portion to show a target portion of the file stored on the file storage, the target portion being appropriate for the user operation, in the file display area if a user operates on the file display area in the first operation screen.

A third aspect of the present invention relates to a portable terminal apparatus comprising:

an access portion that establishes an access to an image processing apparatus;

a request transmitter that transmits to the image processing apparatus to which an access has been established by the access portion, a request for screen data for reproducing a first operation screen including a file display area that shows the entire or a portion of a file or a second operation screen including no file display area;

a receiver that receives in return to the request the screen data for reproducing the first operation screen, but excluding the file display area, from the image processing apparatus along with the file and area reproduction information for reproducing the file display area so that the portable terminal apparatus can reproduce the file display area on the basis of the file; or receives in return to the request the screen data for reproducing the second operation screen from the image processing apparatus;

an operation screen reproducer that reproduces the first operation screen of the image processing apparatus on the basis of the screen data for reproducing the first operation screen and the area reproduction information for reproducing the file display area, if the receiver receives in return to the request the screen data for reproducing the first operation screen from the image processing apparatus; or reproduces the second operation screen of the image processing apparatus on the basis of the screen data for reproducing the second operation screen, if the receiver receives in return to the request the screen data for reproducing the second operation screen from the image processing apparatus;

a terminal display portion that displays the first or second operation screen reproduced by the operation screen reproducer;

a file storage that stores the file received from the image processing apparatus;

an operation judgment portion that judges whether a user operates on the first or second operation screen displayed on the terminal display portion;

a notification transmitter that transmits operation information indicating the user operation to the image processing apparatus if the operation judgment portion judges that a user operates on the second operation screen or the area other than the file display area in the first operation screen; and a display controller that allows the terminal display portion to show a target portion of the file stored on the file storage, the target portion being appropriate for the user operation, in the file display area if the operation judgment portion judges that a user operates on the file display area in the first operation screen.

A fifth aspect of the present invention relates to a non-transitory computer-readable recording medium storing a cooperative program thereon to make a computer of a portable terminal apparatus execute:

establishing an access to an image processing apparatus;

transmitting to the image processing apparatus to which an access has been established, a request for screen data for reproducing a first operation screen including a file display area that shows the entire or a portion of a file or a second operation screen including no file display area;

receiving in return to the request the screen data for reproducing the first operation screen, but excluding the file display area, from the image processing apparatus along with the file and area reproduction information for reproducing the file display area so that the portable terminal apparatus can reproduce the file display area on the basis of the file; or receives in return to the request the screen data for reproducing the second operation screen from the image processing apparatus;

reproducing the first operation screen of the image processing apparatus on the basis of the screen data for reproducing the first operation screen and the area reproduction information for reproducing the file display area, if the screen data for reproducing the first operation screen is received in response to the request from the image processing apparatus; or reproducing the second operation screen of the image processing apparatus on the basis of the screen data for reproducing the second operation screen, if the screen data for reproducing the second operation screen is received in response to the request from the image processing apparatus;

displaying the first or second operation screen reproduced, on a terminal display portion of the portable terminal apparatus;

storing the file received from the image processing apparatus, on a file storage;

judging whether a user operates on the first or second operation screen displayed on the terminal display portion;

transmitting operation information indicating the user operation to the image processing apparatus if a user operates on the second operation screen or the area other than the file display area in the first operation screen; and allowing the terminal display portion to show a target portion of the file stored on the file storage, the target portion being appropriate for the user operation, in the file display area if a user operates on the file display area in the first operation screen.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described in combination with the accompanying drawings.

Figure 1:
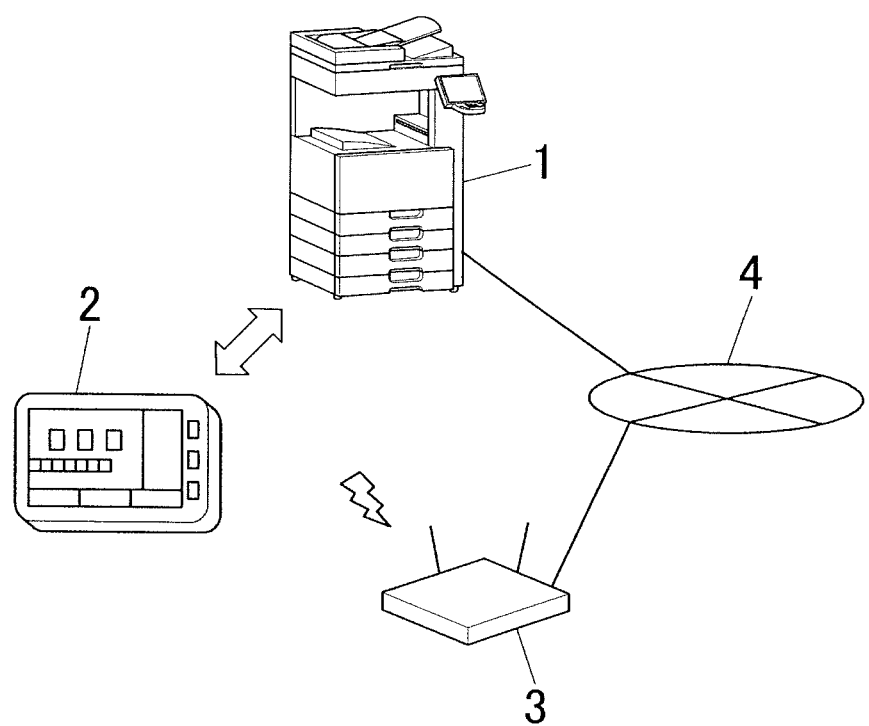
FIG. 1 illustrates a configuration of a cooperative image processing system according to one embodiment of the present invention.

FIG. 1 illustrates a configuration of a cooperative image processing system according to one embodiment of the present invention.

The cooperative image processing system is provided with an image processing apparatus 1 and a portable terminal apparatus 2 such as a smartphone or a tablet computer terminal; the image processing apparatus 1 and the portable terminal apparatus 2 are mutually connected via a wireless LAN router 3 and a network 4 such that they are capable of accessing each other. Alternatively the image processing apparatus 1 and the portable terminal apparatus 2 may be mutually connected via an USB interface or the like, in a wired manner.

In this embodiment, a MFP having various functions such as a copier, printer, scanner, and facsimile function, as described above, is employed as the image processing apparatus 1. Hereinafter, the image processing apparatus 1 will also be referred to as MFP 1. The portable terminal apparatus 2 will also be referred to as portable terminal 2.

Figure 2:
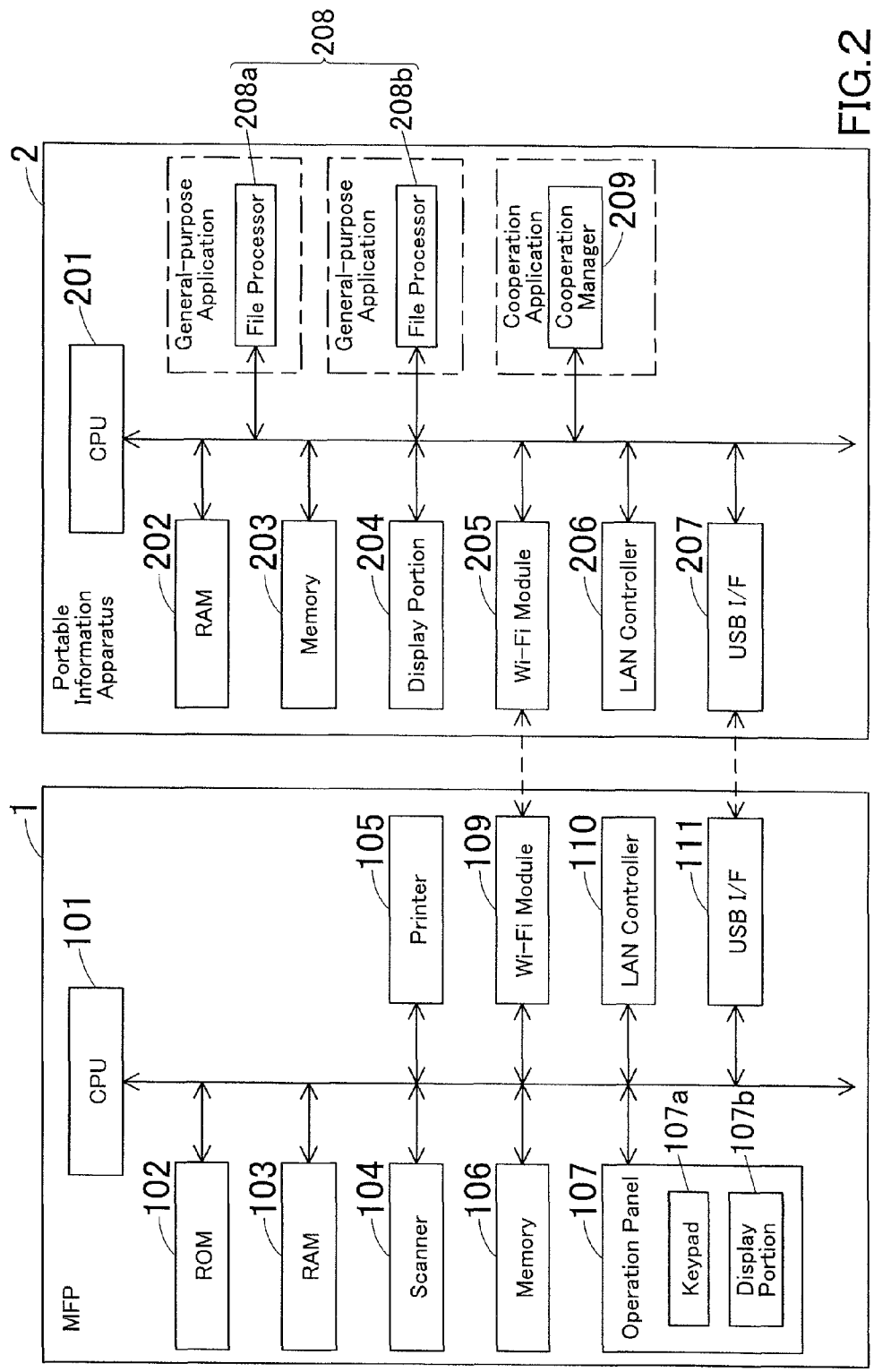
FIG. 2 is a block diagram illustrating an electrical configuration of an image processing apparatus and a portable terminal apparatus.

FIG. 2 is a block diagram illustrating an electrical configuration of the MFP 1 and the portable terminal 2.

The MFP 1 is provided with: a CPU 101, a ROM 102, a RAM 103, a scanner 104, a printer 105, a memory 106, an operation panel 107, a wireless fidelity module (Wi-Fi module) 109, a local area network controller (LAN controller) 110, an USB interface (USB I/F) 111, and the like.

The CPU 101 controls the entire MFP 1 in a unified and systematic manner in accordance with operation programs stored on a memory such as the ROM 102. Specifically, in this embodiment, in addition to enabling various functions of the MFP 1, the CPU 101 controls the following operations, for example: transmitting screen data for reproducing an operation screen of the MFP 1 to the portable terminal 2 as requested by the portable terminal 2; judging whether the operation screen which is requested from the portable terminal 2 is a first operation screen including a file display area that shows the entire or a portion of a file or a second operation screen including no file display area; identifying the position of the file display area in the first operation screen; and identifying the file in the file display area to read it out of the memory 106. The first operation screen may be a file preview screen including a file display area that shows a preview of a file, for example.

The CPU 101 further changes a kind of screen data for reproducing an operation screen transmitted to the portable terminal 2 depending on whether the operation screen is the first or second operation screen. A detail explanation is mentioned later.

The ROM 102 is a memory that stores operation programs for the CPU 101; the RAM 103 is a memory that provides a work area for the CPU 101 to perform processing in accordance with operation programs.

The scanner 104 reads out images from a document put on a platen glass or in an automatic document feeder not shown in the figure and outputs image data that is electronic data.

The printer 105 prints on sheets of paper, image data obtained by scanning a document with the scanner 104 and print data received from the portable terminal 2 or the like.

The memory 106, which consists of a hard disk device, stores various types of data, applications, and the like. Specifically, in this embodiment, the memory 106 stores screen data for reproducing various operation screens of the MFP 1; the CPU 101 reads screen data for an appropriate operation screen for the user operation, out of the memory 106, displays the screen on the operation panel 107 and transmits the screen data to the portable terminal 2. The memory 106 further stores various and a plurality of files such as document files consisting of images obtained by the scanner 104 and document files received from the external devices.

The operation panel 107 allows users to operate the MFP 1 while displaying messages and other information thereon. The operation panel 107 is provided with: a keypad 107a having a Start key, numeric and other keys; and a display portion 107b that consists of a liquid-crystal display, for example, with touch-panel functionality.

The Wi-Fi module 109 is an interface for wireless connection to the portable terminal 2; the LAN controller 110 controls the communication with external apparatuses such as personal computers and other MFPs.

The USB interface 111 is an interface for physical connection to the portable terminal 2.

Meanwhile, the portable terminal 2 consists of a smartphone, a tablet computer terminal, electronic paper, and the like. The portable terminal 2 is provided with: a CPU 201; a RAM 202; a memory 203; a display portion 204; a Wi-Fi module 205; a LAN controller 206; an USB interface 207; file processors 208a and 208b; a cooperation manager 209; and the like.

The CPU 201 controls the entire portable terminal 2 in a unified and systematic manner in accordance with an operating system (OS), which is basic software, and general-purpose applications.

The RAM 202 is a memory that provides a work area for the CPU 201 to perform processing in accordance with operation programs.

The memory 203, which consists of a hard disk device, stores various types of data, applications, and the like. Specifically, in this embodiment, the memory 203 stores programs such as a basic OS, a cooperation application, and general-purpose applications. Hereinafter, applications also will be referred to simply as "app".

The display portion 204 consists of a liquid-crystal display, for example, with touch-panel functionality.

The Wi-Fi module 205 is an interface for wireless connection between the MFP 1 and the portable terminal 2; the LAN controller 206 controls the communication with external apparatuses such as user terminals. The USB interface 207 is an interface for physical connection between the MFP 1 and the portable terminal 2.

The file processors 208a and 208b perform processing on files. Specifically, the file processors 208a and 208b edit files, transfers files, and transmits files by electronic mail. Hereinafter, a file processor 208 will be described as a representative of both the file processors 208a and 208b.

The cooperation manager 209 facilitates access to the functions of the MFP 1 by achieving smooth cooperation between the MFP 1 and the portable terminal 2. Specifically, in order to allow users to access copier, printer, scanner, facsimile and other functions of the MFP 1, the cooperation manager 209 receives screen data from the MFP 1 and displays on the display portion 204, a screen that looks identical with a first or second setting screen on the operation panel 107 of the MFP 1, as a remote screen. Furthermore when a user touches on the remote screen on the display portion 204, the cooperation manager 209 detects the coordinate of a touch position of the remote screen and transmits it as operation information indicating the user operation to the MFP 1. By analyzing the coordinate of the touch position, the MFP 1 recognizes what the user instruction is and performs processing accordingly.

By the way, the file processor 208 is enabled to execute its functions when the CPU 201 activates a general-purpose application. The general-purpose application is software to enable the file processor 208 to perform processing on files. There are various types of general-purpose application: some of them have the function of transmitting files by electronic mail and others have the function of storing files on a Web server, for example.

The cooperation manager 209 is enabled to execute its functions when the CPU 201 activates a cooperation application. The cooperation application is software to achieve smooth cooperation between the MFP 1 and the portable terminal 2. Each general-purpose application and the cooperation application are allowed to mutually exchange files and download files from each other.

Figure 3:
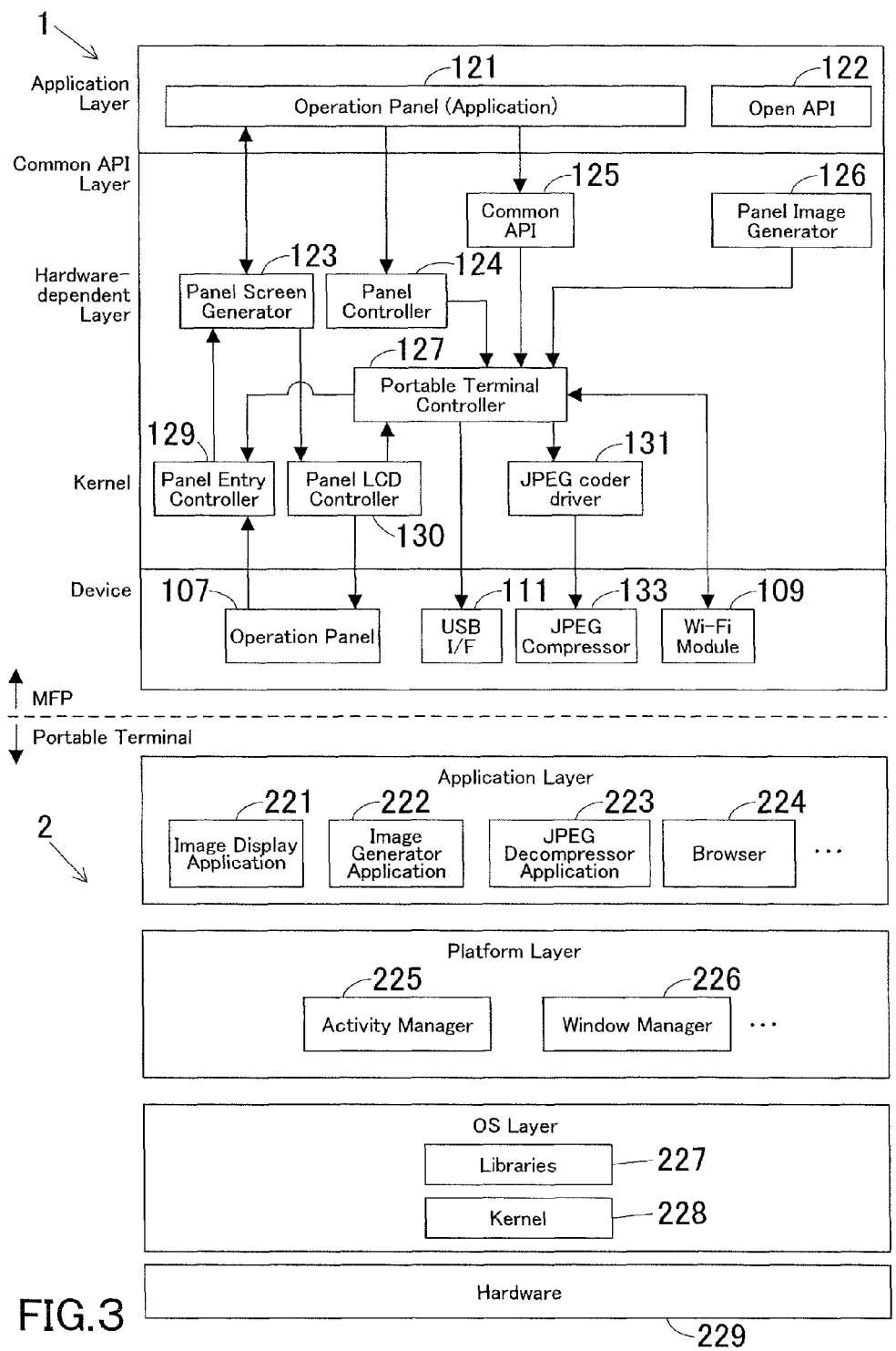
FIG. 3 is a block diagram illustrating a firmware configuration of the image processing apparatus and the portable terminal apparatus.

FIG. 3 is a block diagram illustrating a firmware configuration of the MFP 1 and the portable terminal 2.

The MFP 1 has: an operation panel (application) 121; an open application program interface (open API) 122; and the like in its application layer, a common application program interface (common API) 125; a panel image generator 126; and the like in its common API layer, and a panel screen generator 123; a panel controller 124; portable terminal controller 127; and the like in its hardware-dependent layer.

The MFP 1 also has: a panel entry controller 129; a panel LCD controller 130; a JPEG coder driver 131; and the like in its kernel, and an operation panel 107; an USB interface 111; a JPEG compressor 133; a Wi-Fi module 109; and the like in its devices.

The panel screen generator 123 generates screen data for reproducing an operation screen that is displayed on the operation panel 107, when a user starts the cooperation from the portable terminal 2. Specifically, if the portable terminal 2 requests a first operation screen including a file display area, just like a file preview screen, the panel screen generator 123 generates screen data for reproducing the first operation screen, but excluding its file display area. In contrast, if a second operation screen including no file display area is requested, the panel screen generator 123 generates screen data for reproducing the second operation screen.

The panel controller 124 controls communication of the operation panel 107. Upon receiving a request for screen data for displaying a remote screen that is a first operation screen including a file display area when cooperation is enabled, the panel image generator 126 identifies the position of the file display area in the first operation screen to generate first position information defining that position and also identifies the target file and the position of the target image in the file, which is displayed in the file display area, to generate second position information defining that position. The first and second position information will be transmitted as area reproduction information for reproducing a file display area, to the portable terminal 2 along with the file so that the portable terminal 2 can reproduce a file display area on its display portion.

The portable terminal controller 127 controls an interface for communicating with the portable terminal 2 and also controls others under the cooperation between the MFP 1 and the portable terminal 2.

The panel entry controller 129 performs control of input operations via the operation panel 107; the panel LCD controller 130 performs display control of the display portion 107b. The JPEG compressor 133 compresses into JPEG form files and screen data for reproducing an operation screen, which are received from the portable terminal controller 127 by way of the JPEG codec driver 131, and transmits the compressed files and data to the portable terminal 2 by way of the USB interface 111 and the Wi-Fi module 109.

The portable terminal 2 is composed of: an application layer including an image display application 221, an image generator application 222, a JPEG decompressor application 223, and various applications such as a browser; a platform layer including an activity manager 225, a window manager 226, and other managers; an OS layer including various libraries 227 and a kernel 228; and a hardware 229.

The JPEG decompressor application 223 decompresses the compressed files and data received from the MFP 1. Upon receiving screen data for reproducing a first operation screen including a file display area, which is compressed, from the MFP 1, the image generator application 222 generates a data object to be inserted in the file display area, on the basis of the second position information and the file decompressed by the JPEG decompressor application 223. When a user performs zooming in, zooming out, or flipping to the next page on the data object that is shown in the file display area, from the portable terminal 2, the image generator application 222 generates an enlarged data object, a reduced-size data object, or a data object of the next page depending on the user operation on the basis of the original file received from the MFP 1, such that the data object fits to the file display area whose size is defined by the second position information.

The image display application 221 reproduces and displays an operation screen of the MFP 1 on the display portion 204 as a remote screen on the basis of screen data received from the MFP 1, after the screen data is decompressed by the JPEG decompressor application 223. Specifically, on the basis of screen data for reproducing a second operation screen, the image display application 221 reproduces and displays a second operation screen on the display portion 204. Alternatively on the basis of screen data for reproducing a first operation screen, the image display application 221 reproduces a first operation screen including the data object generated by the image generator application 222 in its file display area whose position is defined by the second position information. Then the image display application 221 displays the first operation screen on the display portion 204.

Similarly, when a user performs zooming in, zooming out, or flipping to the next page on the data object that is shown in the file display area, from the portable terminal 2, the image generator application 222 generates an enlarged data object, a reduced-size data object, or a data object of the next page depending on the user operation, then the image display application 221 reproduces a first operation screen including the data object generated by the image generator application 222 in its file display area. Subsequently the display portion 204 displays the first operation screen.

In this embodiment, the image display application 221, the image generator application 222, and the JPEG decompressor application 223 are configured such that they can achieve one of the functions of the cooperation application.

Hereinafter, how the MFP 1 facilitates the cooperation with the portable terminal 2.

Here, a user is trying to access the MFP 1 via the network from the portable terminal 2 in a wired or wireless manner to perform operations under the cooperation with the MFP 1 and the portable terminal 2. The user will start the cooperation between the MFP 1 and the portable terminal 2 by activating a cooperation application installed on the portable terminal 2.

Figure 4:
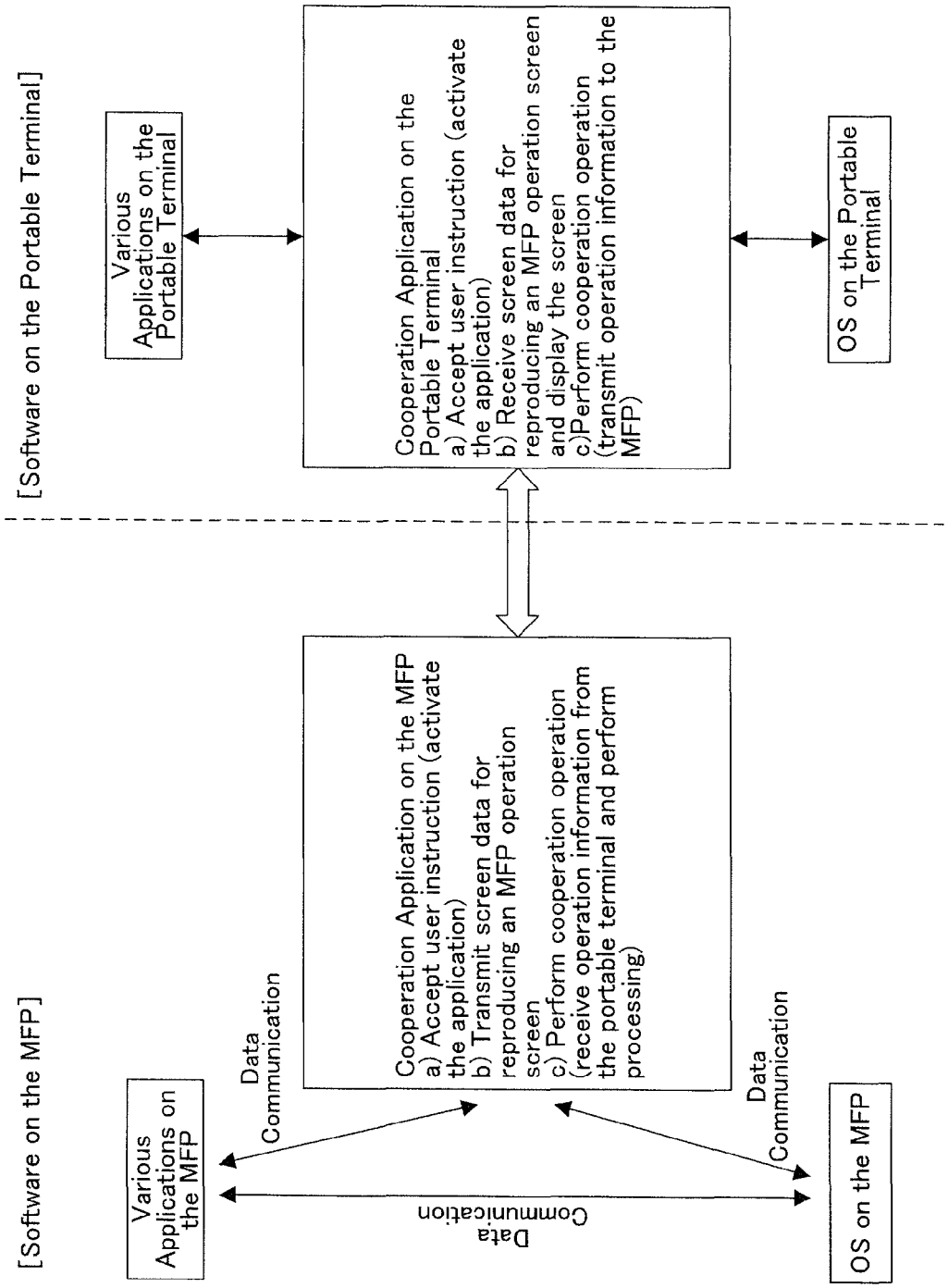
FIG. 4 illustrates the relationship among applications installed on the image processing apparatus and the portable terminal apparatus.

FIG. 4 illustrates the relationship among applications installed on the MFP 1 and the portable terminal 2; the applications on the MFP 1 are shown on the left side of the operation screen and the applications on the portable terminal 2 are shown on the right side of the operation screen.

With the cooperation application of the portable terminal 2, which is positioned between an operating system (OS) of the portable terminal 2 and application software that is general-purpose, the portable terminal 2 is allowed to transmit operation information of the user, exchange data with the MFP 1, and receive screen data from the MFP 1 when necessary. In other words, the cooperation application of the portable terminal 2 accepts user instructions on the portable terminal 2, for example, instructions for activating applications; receives screen data for reproducing an operation screen of the MPF 1; displays the operation screen; and performs any other operations for facilitating the cooperation with the MFP 1. The any other operations for facilitating the cooperation with the MFP 1 include transmitting operation information indicating the details of user operation.

If the MFP 1 is allowed to obtain all necessary information anytime because its OS and its general-purpose application software are all designed or customized in-house, the cooperation software of the MFP 1 does not necessarily have to be positioned between the OS and the general-purpose application software. That is, the cooperation application of the MFP 1, which is completely independent of the OS and the general-purpose application software, may obtain all necessary information by communicating with the OS and the general-purpose application software. The cooperation application of the MFP 1 accepts user instructions on the MFP 1, for example, instructions for activating applications; transmits screen data for reproducing an operation screen of the MFP 1 (and preparing the screen data); and performs any other operations for facilitating the cooperation with the portable terminal 2. The any other operations for facilitating the cooperation with the portable terminal 2 includes: receiving operation information indicating the details of user operation; and performing image processing.

When a user gives instructions to start the cooperation with the MFP 1 by pressing a cooperation icon on an operation screen on the display portion 204 of the portable terminal 2, the cooperation application of the portable terminal 2 activates the cooperation application of the MFP 1 and transmits a request for screen data for reproducing an operation screen of the MFP 1, by communicating with the MFP 1 that is registered in advance. At the same time, the cooperation mode is turned on; an operation screen of the MFP 1 is displayed both on the display portion 107b of the MFP 1 and the display portion 204 of the portable terminal 2. Alternatively, different operation screens of the MFP 1 and the portable terminal 2 may be displayed together side by side on the display portion 204 of the portable terminal 2.

When the user operates on a remote screen displayed on the portable terminal 2, which is an operation screen of the MFP 1, the portable terminal 2 transmits operation information indicating the user operation to the MFP 1. If the operation information indicates the user's instruction for job execution, for example, the MFP 1 performs processing accordingly. If the user operation causes the need for the portable terminal 2 to display another operation screen, the MFP 1 transmits screen data for reproducing another operation screen of the MFP 1 to the portable terminal 2.

Alternatively when the user selects a file stored on the MFP 1 and gives an instruction to display a first operation screen including a file display area, for example a file preview screen, via an operation screen displayed on the display portion 107b of the MFP 1, the MFP 1 displays the file preview screen on the display portion 107b.

Figure 5:
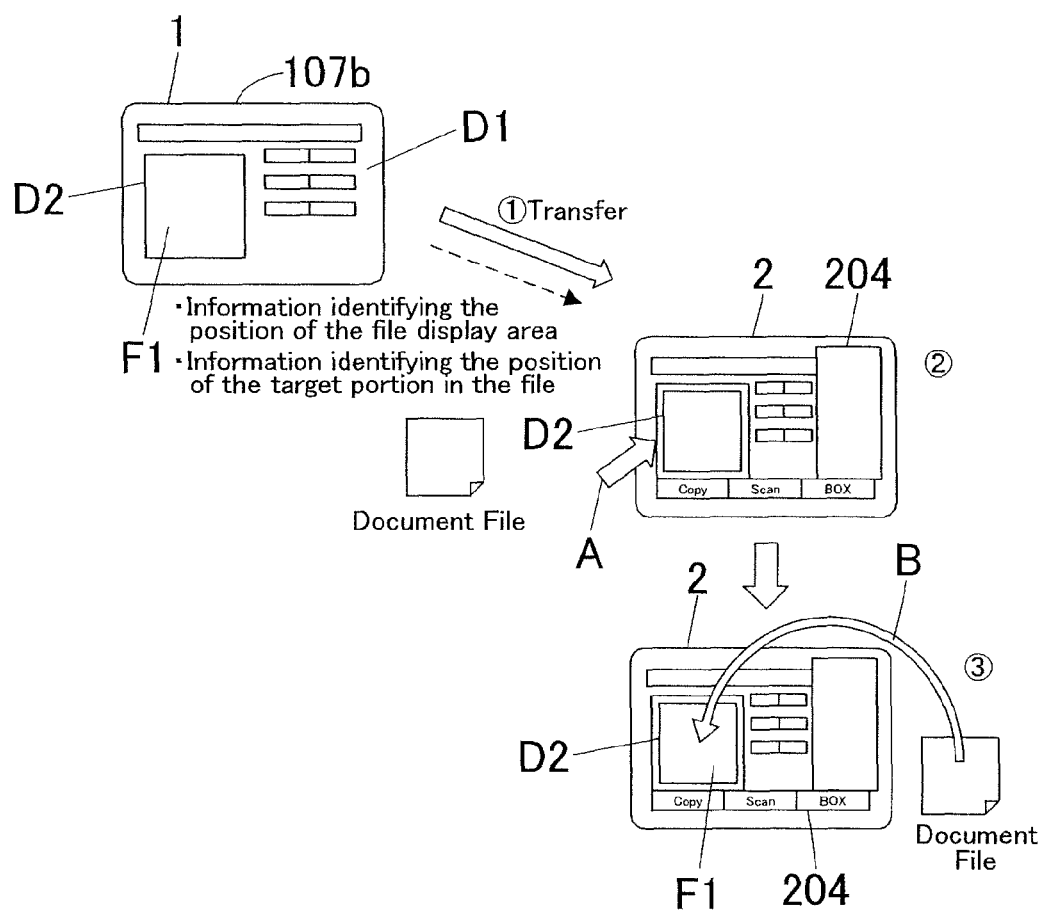
FIG. 5 is a view to explain the operations of the cooperative image processing system.

FIG. 5 illustrates a file preview screen D1 that is displayed on the display portion 107b of the MFP 1, and the file preview screen D1 includes a file display area D2 that shows a target portion F1 of the selected file. In this embodiment, the file display area D2 shows the file page by page; alternatively the file display area D2 may show only a part of one page of the file or, if the file has a few pages, all the pages together In order to see the file preview screen D1 on the display portion 204 of the portable terminal 2 which is larger than the size of the display portion 107b of the MFP 1, the user turns on the cooperation mode and transmits a request for screen data for reproducing the operation screen that is currently displayed on the display portion 107b of the MFP 1, from the portable terminal 2.

Receiving this request, the MFP 1 judges whether a first operation screen including a file display area or a second operation screen including no file display area is currently displayed.

If a second operation screen including no file display area is currently displayed, the MFP 1 compresses screen data for reproducing the second operation screen and transmits to the portable terminal 2. If a first operation screen including a file display area is currently displayed, the MFP 1 compresses screen data for reproducing the first operation screen, but excluding its file display area D2, and transmits to the portable terminal 2 as indicated by number 1 of FIG. 5. Furthermore the MFP 1 identifies the file shown in the file display area D2, compresses the entire file, and transmits the compressed file to the portable terminal 2 along with area reproduction information for reproducing the file display area D2, so that the portable terminal 2 can reproduce the first operation screen including the file display area D2.

The area reproduction information for reproducing a file display area is: the first position information defining the position of the file display area D2 in the operation screen D1; and the second position information defining the position of the target portion F1 in the file, which is currently displayed in the file display area D2. In this embodiment, the file is displayed page by page in the file display area D2. The second position information indicating the position of the target portion F1 in the file is therefore information of the page currently displayed.

Receiving the file and the screen data from the MFP 1, the portable terminal 2 stores the file on the memory 203 and reproduces an operation screen of the MFP 1 as a remote screen on the basis of the screen data. Specifically, if it is screen data for reproducing a second operation screen including no file display area, the portable terminal 2 reproduces the second operation screen.

If it is screen data for reproducing a first operation screen including a file display area, the portable terminal 2 identifies the position of the file display area D2 in the first operation screen as indicated by arrow A of FIG. 5, on the basis of the first position information received from the MFP 1 (number 2 of FIG. 5).

Then the portable terminal 2 generates a data object to be inserted into the file display area D2, on the basis of the file and the second position information also received from the MFP 1. Subsequently the portable terminal 2 displays the first operation screen on the display portion 204 by inserting the data object into the file display area D2 whose position is identified, as indicated by arrow B of FIG. 5 (number 3 of FIG. 5).

In this way the portable terminal 2 is allowed to display a remote screen that looks identical with a file preview screen on the operation panel 107 of the MFP 1, on the display portion 204.

When the user performs zooming in, zooming out, or flipping to the next page on the data object that is shown in the file display area D2 by using a common file-handling function enabled on the portable terminal 2, such as "pinching", the portable terminal 2 generates another data object to be inserted into the file display area D2, which is appropriate for the user operation, accordingly.

Specifically, the portable terminal 2 generates an enlarged data object, a reduced-size data object, or a data object of the next page on the basis of the file stored on the memory 203 such that the data object fits to the file display area D2 whose size is defined by the first or second position information. Subsequently, the portable terminal 2 reproduces the first operation screen by inserting the data object into the file display area D2 and displays on the display portion 204.

As described above, in this embodiment, when a user operates on the file display area D2 of the first operation screen D1, the portable terminal 2 shows a target portion of the original file received from the MFP 1 and stored on the portable terminal 2 itself, which is appropriate for the user operation, in the file display area D2. That eliminates the conventional need for the MFP 1 to generate a data object to be inserted into the file display area D2, which is appropriate for the user operation, and also for the portable terminal 2 to receive that data object from the MFP 1, and thus the portable terminal 2 is allowed to perform screen switching rapidly.

That also eliminates the conventional need for the MFP 1 to compress a data object to be inserted into the file display area D2 and also for the portable terminal 2 to decompress that data object, and thus the image quality can be prevented from being degraded by compression and decompression. Since degradation effects on files by compression and decompression is very small compared to the same on data objects to be inserted into the file display area, the MFP 1 may transmit an original file in a compressed form to the portable terminal 2 as necessary also in this embodiment.

Furthermore, in this embodiment, the portable terminal 2 obtains a target portion from the original file and shows it in the file display area D2, and thus even when operating on a file shown in the file display area D2 users can use any file-handling function enabled on the portable terminal 2. This system would significantly improve the convenience of users.

In this embodiment, the portable terminal 2 transmits to the MFP 1a request for a file preview screen after the MFP 1 displays the file display screen on the operation panel 107. Alternatively, while the MFP 1 does not need to display the file preview screen thereon, the portable terminal 2 may transmit to the MFP 1a request for screen data for reproducing a file preview screen after the user turns on the cooperation mode and specifies a target file to be previewed.

In this case, a preview of the target file may be selected among a plurality of document files stored on the memory 106. Alternatively, a preview may be displayed as soon as obtaining it by scanning a physical document with the scanner 104.

Figure 6:
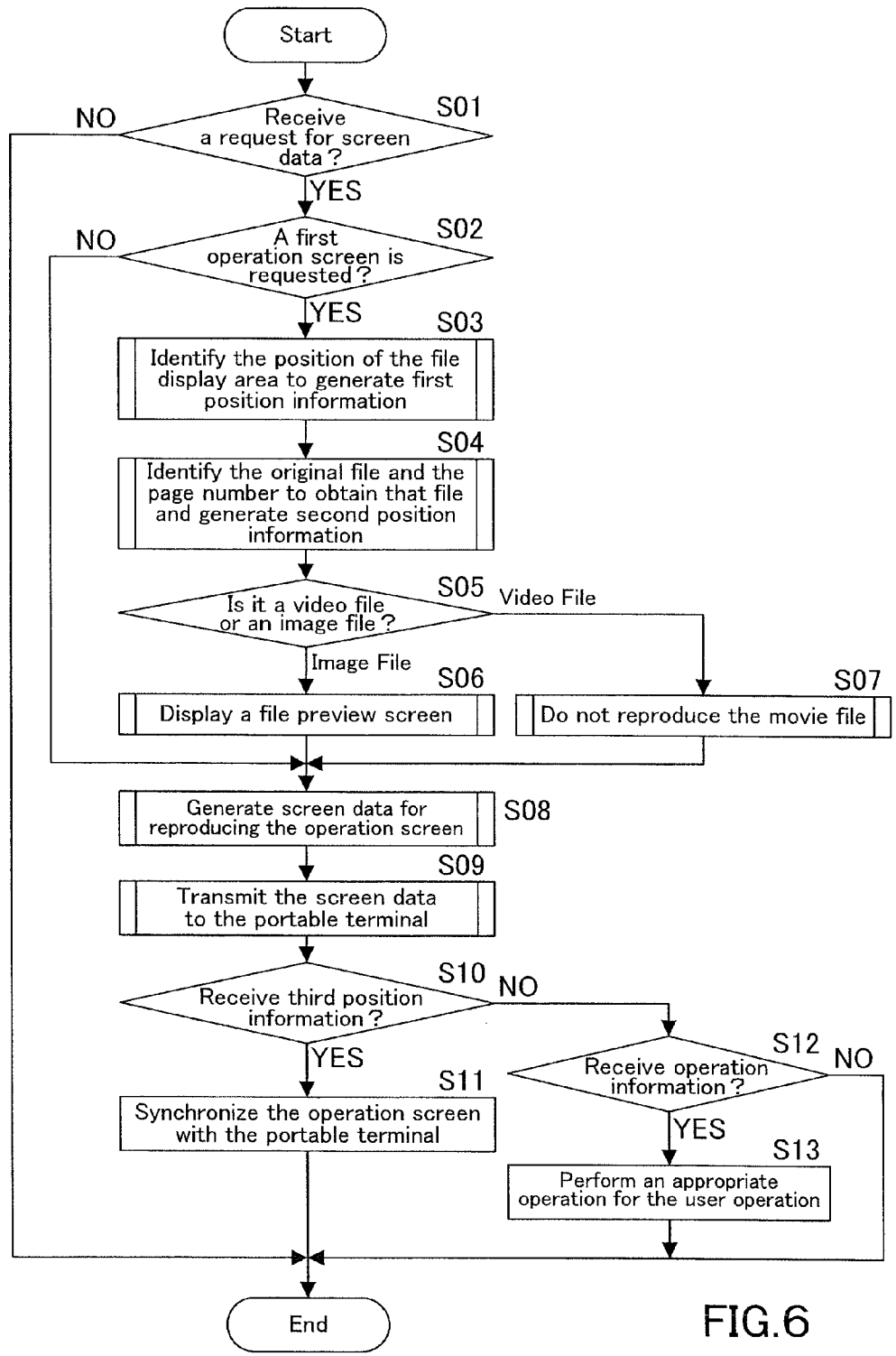
FIG. 6 is a flowchart representing the operation of the information processing apparatus when cooperation is enabled.

FIG. 6 is a flowchart representing the operation of the MFP 1 when cooperation is enabled. The operation is executed by the CPU 101 of the MFP 1 in accordance with an operation program stored on a memory such as the ROM 102.

In Step S01, it is judged whether or not to receive a request for screen data for reproducing an operation screen from the portable terminal 2. If the MFP 1 does not receive such a request, the routine terminates immediately. If the MFP 1 receives such a request (YES in Step S01), then it is judged in Step S02 whether or not a first operation screen including a file display area is requested. If the first operation screen is requested (YES in Step S02), the routine proceeds to Step S03; if the first operation screen is not requested (NO in Step S02), the routine proceeds to Step S08.

In Step S03, the MFP 1 identifies the position of the file display area in the operation screen to generate first position information defining that position. From the aspect of ease and precision, it is preferred that the first position information be coordinates that define the position of the file display area in the operation screen.

In Step S04, the MFP 1 identifies the original file displayed on the file display area and the page number of the file to obtain that file and generate page information (second position information) indicating that page number.

In Step S05, it is judged whether it is an image file or a movie file. If it is an image file ("image file" in Step S05), the MFP 1 displays a file preview screen in Step S06. Then the routine proceeds to Step S08. If the file preview screen is already displayed before that, the MFP 1 continuously displays that screen in Step S06. If it is a movie file in Step S05 ("movie file" in Step S05), the MFP 1 does not reproduce the movie file in Step S07. Then the routine proceeds to Step S08.

The MFP 1 generates screen data for reproducing the operation screen in Step S08, then transmits the screen data to the portable terminal 2 in Step S09. Specifically, if the operation screen is a second operation screen including no file display area, the MFP 1 transmits screen data for reproducing the second operation screen. If the operation screen is a first operation screen including a file display area is displayed, the MFP 1 transmits screen data for reproducing the first operation screen, but excluding its file display area, along with: the file itself; the first position information defining the position of the file display area; and the second position information defining the position of the target portion in the file, which is shown in the file display area.

In Step S10, when a user performs zooming in, zooming out, or flipping to the next page from the portable terminal 2, it is judged whether or not to receive third position information indicating the position of the target portion in the file, which is shown in the file display area, from the portable terminal 2. If the MFP 1 does not receive it (No in Step S10), the routine proceeds to Step S12. If the MFP 1 receives it (YES in Step S10), the routine proceeds to Step S11 in which the MFP 1 synchronizes the operation screen on the display portion 107b of the operation panel 107 with the portable terminal 2 by inserting an enlarged data object, a reduced-size data object, or a data object of the next page depending on the user operation, into the file display area. Then the routine terminates.

In Step S12, it is judged whether or not to receive operation information indicating the user operation on the remote screen of the MFP 1, from the portable terminal 2. If the MFP 1 receives it (YES in Step S12), the MFP 1 performs an appropriate operation for the user operation in Step S13. If the MFP 1 performs screen switching in Step S13, the MFP 1 will transmit screen data for reproducing the switched operation screen, to the portable terminal 2; receiving this, the portable terminal 2 will display the operation screen as a remote screen. If the MFP 1 does not receive operation information (NO in Step S12), the routine terminates.

Figure 7:
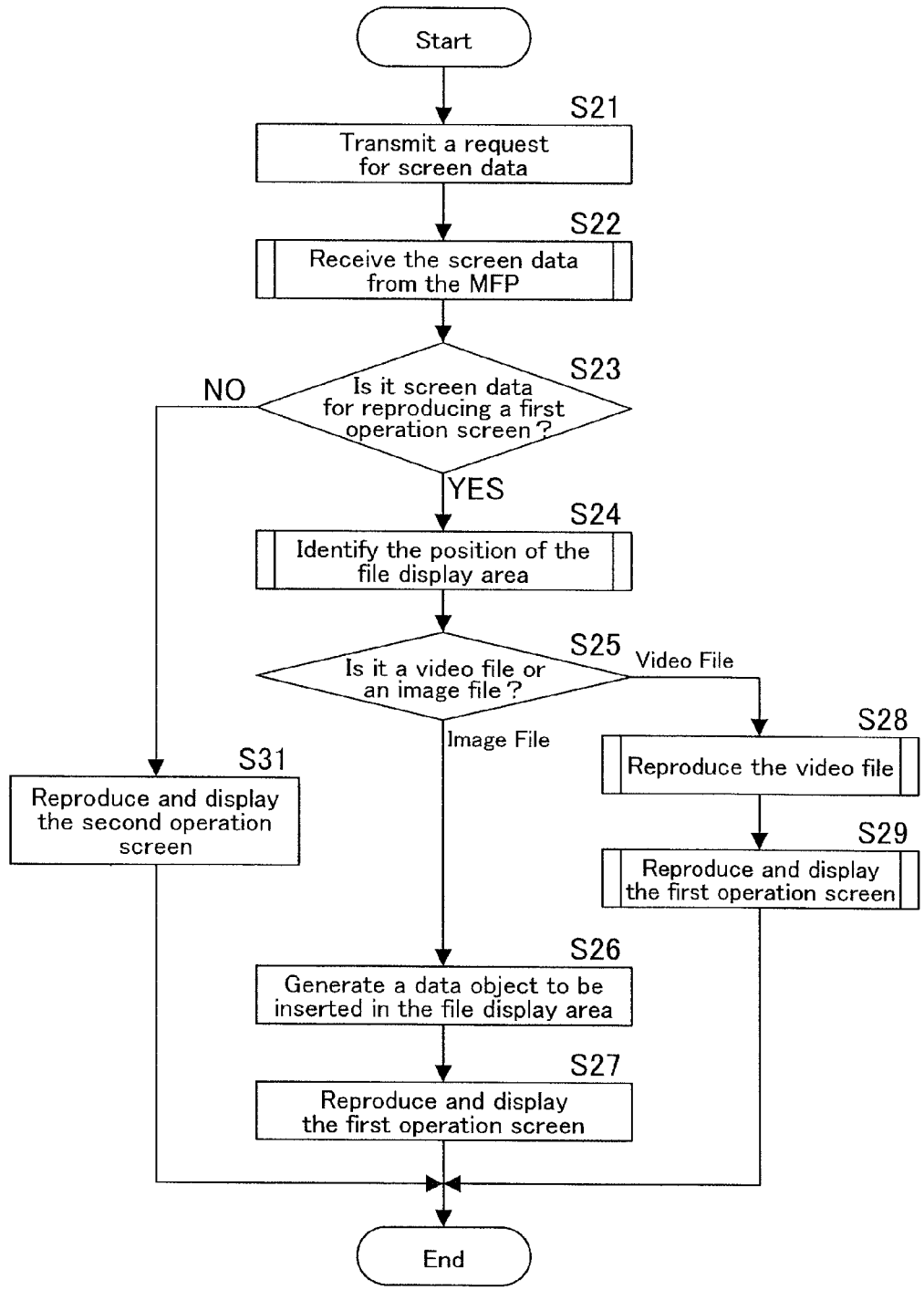
FIG. 7 is a flowchart representing the operation of the portable terminal apparatus when cooperation is enabled.

FIG. 7 is a flowchart that represents the operation of the portable terminal 2 when cooperation is enabled. The operation is executed by the CPU 201 of the portable terminal 2 in accordance with a cooperation application stored on a memory such as the memory 203.

The portable terminal 2 transmits a request for screen data for reproducing an operation screen to the MFP 1 in Step S21, and receives the screen data in return in Step S22.

In Step S23, it is judged whether it is screen data for reproducing a first operation screen including a file display area or a second operation screen including no file display area; if it is screen data for reproducing a first operation screen (YES in Step S23), the portable terminal 2 identifies the position of the file display area on the basis of the first position information also received from the MFP 1 in Step S24. Then it is further judged in Step S25 whether the file also received from the MFP 1 is an image file or a video file.

If it is an image file ("image file" in Step S25), the routine proceeds to Step S26 in which the portable terminal 2 generates a data object to be inserted in the file display area on the basis of the file and the second position information also received from the MFP 1. In Step S27, the portable terminal 2 reproduces and displays the first operation screen by inserting the generated data object into the file display area.

If it is a video file ("video file" in Step S25), the portable terminal 2 reproduces the video file received from the MFP 1 in Step S28. In Step S29, the portable terminal 2 reproduces and displays the first operation screen by showing the reproduced video in the file display area.

In Step S23, if it is screen data for reproducing a second operation screen (NO in Step S23), the routine proceeds to Step S31 in which the portable terminal 2 reproduces and displays the second operation screen on the basis of the screen data received from the MFP 1.

Figure 8:
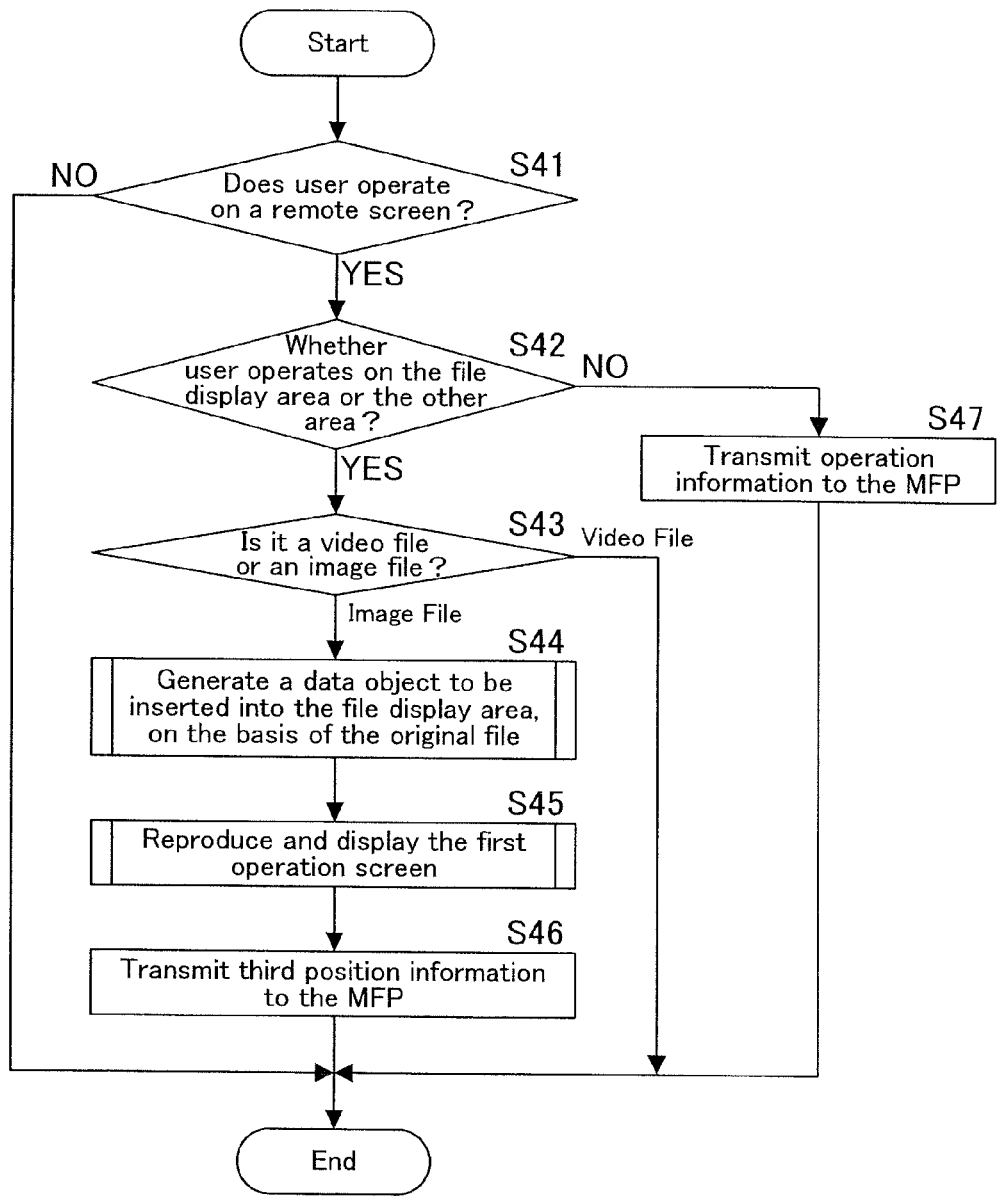
FIG. 8 is a flowchart representing the operation to be performed by the portable terminal apparatus when user operates on an operation screen of the image processing apparatus, which is displayed on a display portion of the portable terminal apparatus.

FIG. 8 is a flowchart representing the operation to be performed by the portable terminal 2 when a user operates on a remote screen of the MFP 1, which is displayed on the display portion 204 of the portable terminal 2. The operation is executed by the CPU 201 of the portable terminal 2 in accordance with a cooperation application stored on a memory such as the memory 203.

In Step S41, it is judged whether or not a user performs zooming in, zooming out, or flipping to the next page on the remote screen of the MFP 1, via the display portion 204. If the user does not operate on the remote screen of the MFP 1 (NO in Step S41), the routine terminates. If the user operates on the remote screen of the MFP 1 (YES in Step S41), then it is judged in Step S42 whether the user operates on the data object in the file display area or the area other than the file display area. A result of the judgment can be easily obtained by identifying the position at which the user touches on the remote screen or the file display area that is defined by coordinates.

If the user operates on the area other than the file display area (NO in Step S42), the portable terminal 2 transmits operation information indicating the user operation to the MFP 1. If the user operates on the data object in the file display area (YES in Step S42), then it is judged in Step S43 whether it is an image file or a video file. If it is a video file ("video file" in Step S43), the routine terminates. If it is an image file ("image file" in Step S43), the routine proceeds to Step S44 in which the portable terminal 2 generates an enlarged data object, a reduced-size data object, or a data object of the next page depending on the user operation, on the basis of the file received from the MFP 1 and stored on the memory 203. Then in Step S45, the portable terminal 2 reproduces and displays the first operation screen by inserting the generated data object into the file display area.

In Step S46, the portable terminal 2 transmits the third position information indicating the position of a different target portion in the file, which is shown in the file display area by the user operation, to the MFP 1. Then the routine terminates.

The present invention, whose one embodiment has been described in details herein, can solve the unsolved problems by its following modes.

[1] A cooperative image processing system comprising an image processing apparatus and a portable terminal apparatus being capable of accessing to each other, the image processing apparatus comprising:

a display portion;

a screen judgment portion that judges whether an operation screen requested from the portable terminal apparatus is a first operation screen including a file display area that shows the entire or a portion of a file or a second operation screen including no file display area, when the image processing apparatus receives a request for screen data for reproducing the operation screen, from the portable terminal apparatus; and a transmitter that transmits the screen data for reproducing the first operation screen, but excluding the file display area, to the portable terminal apparatus along with the file and area reproduction information for reproducing the file display area so that the portable terminal apparatus can reproduce the file display area on the basis of the file, if the screen judgment portion judges that the operation screen requested from the portable terminal apparatus is the first operation screen; or transmits the screen data for reproducing the second operation screen to the portable terminal apparatus, if the screen judgment portion judges that the operation screen requested from the portable terminal apparatus is the second operation screen, the portable terminal apparatus comprising:

a request transmitter that transmits a request for the screen data for reproducing the first or second operation screen to the image processing apparatus;

an operation screen reproducer that reproduces the first operation screen of the image processing apparatus on the basis of the screen data for reproducing the first operation screen and the area reproduction information for reproducing the file display area, if the portable terminal apparatus receives the screen data for reproducing the first operation screen from the image processing apparatus in return to the request; or reproduces the second operation screen of the image processing apparatus on the basis of the screen data for reproducing the second operation screen, if the portable terminal apparatus receives the screen data for reproducing the second operation screen from the image processing apparatus in return to the request;

a terminal display portion that displays the first or second operation screen reproduced by the operation screen reproducer;

a file storage that stores the file received from the image processing apparatus;

an operation judgment portion that judges whether a user operates on the first or second operation screen displayed on the terminal display portion;

a notification transmitter that transmits operation information indicating the user operation to the image processing apparatus if the operation judgment portion judges that a user operates on the second operation screen or the area other than the file display area in the first operation screen; and a display controller that allows the terminal display portion to show a target portion of the file stored on the file storage, the target portion being appropriate for the user operation, in the file display area if the operation judgment portion judges that a user operates on the file display area in the first operation screen.

[2] The cooperative image processing system as recited in the foregoing item [1], wherein:

the area reproduction information includes first position information defining the position of the file display area in the first operation screen and second position information defining the position of the target portion in the file, the target portion being shown in the file display area; and the operation screen reproducer reproduces the first operation screen by showing the target portion in the file, whose position is defined by the second position information, in the file display area whose position is defined by the first position information.

[3] The cooperative image processing system as recited in the foregoing item [1] or [2], wherein:

the image processing apparatus further comprises:

a file storage that stores one or more files; and a file obtaining portion that obtains the file shown in the file display area, from the file storage of the image processing apparatus, if the screen judgment portion judges that the operation screen requested from the portable terminal apparatus is the first operation screen; and the transmitter further transmits the file obtained by the file obtaining portion, to the portable terminal apparatus.

[4] The cooperative image processing system as recited in the foregoing item [2] or [3], wherein the first position information is the coordinates of the file display area in the first operation screen.

[5] The cooperative image processing system as recited in any one of the foregoing items [2] to [4], wherein the first operation screen is a preview display screen including a file display area that shows a preview of the file page by page, and the second position information is page identification of a target page shown in the file display area.

[6] The cooperative image processing system as recited in any one of the foregoing items [1] to [5], wherein the operation judgment portion judges whether a user operates on the first or second operation screen by examining the coordinate of the position at which the user touches on the terminal display portion.

[7] The cooperative image processing system as recited in any one of the foregoing items [1] to [6], wherein the display controller allows the terminal display portion to show the target portion of the file, the target portion being appropriate for the user operation, in the file display area whose position is defined by the first position information.

[8] The cooperative image processing system as recited in any one of the foregoing items [1] to [7], wherein when the user performs flipping to the next page, zooming in, or zooming out on the file display area of the first operation screen displayed on the terminal display portion to show a different target portion in the file display area, third position information defining the position of the different target portion in the file is transmitted to the image processing apparatus.

[9] The cooperative image processing system as recited in the foregoing item [8], wherein when receiving the third position information from the portable terminal apparatus, the image processing apparatus synchronizes the first operation screen with the portable terminal apparatus by showing the different target portion in the file display area whose position is defined by the third position information.

[10] A cooperation method to be implemented by a cooperative image processing system comprising an image processing apparatus and a portable terminal apparatus being capable of accessing to each other, the cooperation method comprising:

the following steps of the image processing apparatus:

judging whether an operation screen requested from the portable terminal apparatus is a first operation screen including a file display area that shows the entire or a portion of a file or a second operation screen including no file display area, when the image processing apparatus receives a request for screen data for reproducing the operation screen, from the portable terminal apparatus; and transmitting the screen data for reproducing the first operation screen, but excluding the file display area, to the portable terminal apparatus along with the file and area reproduction information for reproducing the file display area so that the portable terminal apparatus can reproduce the file display area on the basis of the file, if the operation screen requested from the portable terminal apparatus is the first operation screen; or transmitting the screen data for reproducing the second operation screen to the portable terminal apparatus, if the operation screen requested from the portable terminal apparatus is the second operation screen; and the following steps of the portable terminal apparatus:

transmitting a request for the screen data for reproducing the first or second operation screen to the image processing apparatus;

reproducing the first operation screen of the image processing apparatus on the basis of the screen data for reproducing the first operation screen and the area reproduction information for reproducing the file display area, if the portable terminal apparatus receives in return to the request the screen data for reproducing the first operation screen from the image processing apparatus; or reproducing the second operation screen of the image processing apparatus on the basis of the screen data for reproducing the second operation screen, if the portable terminal apparatus receives in return to the request the screen data for reproducing the second operation screen from the image processing apparatus;

displaying the first or second operation screen reproduced by the operation screen reproducer, on a terminal display portion of the portable terminal apparatus;

storing the file received from the image processing apparatus;

judging whether a user operates on the first or second operation screen displayed on the terminal display portion;

transmitting operation information indicating the user operation to the image processing apparatus if a user operates on the second operation screen or the area other than the file display area in the first operation screen; and allowing the terminal display portion to show a target portion of the file stored on the file storage, the target portion being appropriate for the user operation, in the file display area if a user operates on the file display area in the first operation screen.

[11] A portable terminal apparatus comprising:

an access portion that establishes an access to an image processing apparatus;

a request transmitter that transmits to the image processing apparatus to which an access has been established by the access portion, a request for screen data for reproducing a first operation screen including a file display area that shows the entire or a portion of a file or a second operation screen including no file display area;

a receiver that receives in return to the request the screen data for reproducing the first operation screen, but excluding the file display area, from the image processing apparatus along with the file and area reproduction information for reproducing the file display area so that the portable terminal apparatus can reproduce the file display area on the basis of the file; or receives in return to the request the screen data for reproducing the second operation screen from the image processing apparatus;

an operation screen reproducer that reproduces the first operation screen of the image processing apparatus on the basis of the screen data for reproducing the first operation screen and the area reproduction information for reproducing the file display area, if the receiver receives in return to the request the screen data for reproducing the first operation screen from the image processing apparatus; or reproduces the second operation screen of the image processing apparatus on the basis of the screen data for reproducing the second operation screen, if the receiver receives in return to the request the screen data for reproducing the second operation screen from the image processing apparatus;

a terminal display portion that displays the first or second operation screen reproduced by the operation screen reproducer;

a file storage that stores the file received from the image processing apparatus;

an operation judgment portion that judges whether a user operates on the first or second operation screen displayed on the terminal display portion;

a notification transmitter that transmits operation information indicating the user operation to the image processing apparatus if the operation judgment portion judges that a user operates on the second operation screen or the area other than the file display area in the first operation screen; and a display controller that allows the terminal display portion to show a target portion of the file stored on the file storage, the target portion being appropriate for the user operation, in the file display area if the operation judgment portion judges that a user operates on the file display area in the first operation screen.

[12] The portable terminal apparatus as recited in the foregoing item [11], wherein:

the area reproduction information includes first position information defining the position of the file display area in the first operation screen and second position information defining the position of the target portion in the file, the target portion being shown in the file display area; and the operation screen reproducer reproduces the first operation screen by showing the target portion in the file, whose position is defined by the second position information, in the file display area whose position is defined by the first position information.

[13] The portable terminal apparatus as recited in the foregoing item [12], wherein the first position information is the coordinates of the file display area in the first operation screen.

[14] The portable terminal apparatus as recited in the foregoing item [12] or [13], wherein the first operation screen is a preview display screen including a file display area that shows a preview of the file page by page, and the second position information is page identification of a target page shown in the file display area.

[15] The portable terminal apparatus as recited in any one of the foregoing items [11] to [14], wherein the operation judgment portion judges whether a user operates on the first or second operation screen by examining the coordinate of the position at which the user touches on the terminal display portion.

[16] The portable terminal apparatus as recited in any one of the foregoing items [11] to [15], wherein the display controller allows the terminal display portion to show the target portion of the file, the target portion being appropriate for the user operation, in the file display area whose position is defined by the first position information.

[17] The portable terminal apparatus as recited in any one of the foregoing items [11] to [16], wherein when the user performs flipping to the next page, zooming in, or zooming out on the file display area of the first operation screen displayed on the terminal display portion to show a different target portion in the file display area, third position information defining the position of the different target position in the file is transmitted to the image processing apparatus.

[18] A non-transitory computer-readable recording medium storing a cooperative program thereon to make a computer of a portable terminal apparatus execute:

establishing an access to an image processing apparatus;

transmitting to the image processing apparatus to which an access has been established, a request for screen data for reproducing a first operation screen including a file display area that shows the entire or a portion of a file or a second operation screen including no file display area;

receiving in return to the request the screen data for reproducing the first operation screen, but excluding the file display area, from the image processing apparatus along with the file and area reproduction information for reproducing the file display area so that the portable terminal apparatus can reproduce the file display area on the basis of the file; or receives in return to the request the screen data for reproducing the second operation screen from the image processing apparatus;

reproducing the first operation screen of the image processing apparatus on the basis of the screen data for reproducing the first operation screen and the area reproduction information for reproducing the file display area, if the screen data for reproducing the first operation screen is received in response to the request from the image processing apparatus; or reproducing the second operation screen of the image processing apparatus on the basis of the screen data for reproducing the second operation screen, if the screen data for reproducing the second operation screen is received in response to the request from the image processing apparatus;

displaying the first or second operation screen reproduced, on a terminal display portion of the portable terminal apparatus;

storing the file received from the image processing apparatus, on a file storage;

judging whether a user operates on the first or second operation screen displayed on the terminal display portion;

transmitting operation information indicating the user operation to the image processing apparatus if a user operates on the second operation screen or the area other than the file display area in the first operation screen; and allowing the terminal display portion to show a target portion of the file stored on the file storage, the target portion being appropriate for the user operation, in the file display area if a user operates on the file display area in the first operation screen.

According to the aforementioned mode [1] of the invention, upon receiving a request for screen data for an operation screen of the image processing apparatus from the portable terminal apparatus, the image processing apparatus judges whether a first operation screen including a file display area that shows the entire or a portion of a file or a second operation screen including no file display area is requested; if the first operation screen is requested, the image processing apparatus transmits to the portable terminal apparatus, screen data for reproducing the first operation screen, but excluding its file display area, along with a file and area reproduction information for reproducing the file display area so that the portable terminal apparatus can reproduce the file display area on the basis of the file. Receiving the screen data for reproducing the first operation screen excluding the file display area, the file, and the area reproduction information from the image processing apparatus, the portable terminal apparatus reproduces the first operation screen including the file display area that shows the file, on the basis of all those from the image processing apparatus. Then the portable terminal apparatus displays the first operation screen on the display portion. When a user operates on the file display area in the first operation screen from the portable terminal apparatus, the portable terminal apparatus shows a target portion of the file stored on the file storage, which is appropriate for the user operation, in the file display area of the first operation screen.

In other words, when a user operates on the file display area of the first operation screen from the portable terminal apparatus, the portable terminal apparatus shows in the file display area a target portion of the original file received from the image processing apparatus and stored on the portable terminal apparatus itself, which is appropriate for the user operation. That eliminates the conventional need for the image processing apparatus to generate a preview to be inserted into the file display area, which is appropriate for the user operation, and also for the portable terminal apparatus to receive that preview from the image processing apparatus, and thus the portable terminal apparatus is allowed to perform screen switching rapidly.

That also eliminates the conventional need for the image processing apparatus to compress a preview to be inserted into the file display area and also for the portable terminal apparatus to decompress that preview, and thus the image quality can be prevented from being degraded by compression and decompression.

Furthermore, the portable terminal apparatus obtains a target portion from the original file and shows it in the file display area, and thus users can use any file-handling function enabled on the portable terminal apparatus even when operating on a file shown in the file display area. This system would significantly improve the convenience of users.

According to the aforementioned mode [2] of the invention, area reproduction information includes first position information defining the position of the file display area in the first operation screen and second position information defining the position of the target portion in the file, the target portion being shown in the file display area, and thus the portable terminal apparatus is allowed to reproduce the first operation screen including the file display area on the basis of the file and the area reproduction information both received from the image processing apparatus.

According to the aforementioned mode [3] of the invention, the image processing apparatus is allowed to transmit the file that is shown in the file display area, to the portable terminal apparatus with no difficulty.

According to the aforementioned mode [4] of the invention, the first position information is the coordinates of the file display area in the first operation screen, and thus the portable terminal apparatus is allowed to identify the position of the file display area with no difficulty.

According to the aforementioned mode [5] of the invention, the portable terminal apparatus is allowed to display a preview display screen including a file display area that shows a preview of the file page by page and identify a target page of the file by receiving page identification of the target page that is shown in the file display area, from the image processing apparatus.

According to the aforementioned mode [6] of the invention, the portable terminal apparatus is allowed to judge whether or not the user operates on the first or second operation screen with no difficulty by examining the coordinate of the position at which the user touches on the terminal display portion.

According to the aforementioned mode [7] of the invention, the portable terminal apparatus is allowed to show the target portion of the file, which is appropriate for the user operation, in the file display area whose position is defined by the first position information.

According to the aforementioned mode [8] of the invention, when the user performs flipping to the next page, zooming in, or zooming out on the file display area of the first operation screen displayed on the terminal display portion to show a different target portion in the file display area, the portable terminal apparatus transmits third position information defining the position of the different target portion in the file to the image processing apparatus, and thus the image processing apparatus is allowed to identify the different target portion that is shown in the file display area of the first operation screen.

According to the aforementioned mode [9] of the invention, the image processing apparatus is allowed to synchronize the first operation screen with the portable terminal apparatus by showing an identical target portion in the file display area on the display portion as that in the file display area on the terminal display portion.

According to the aforementioned mode [10] of the invention, when a user operates on the file display area of the first operation screen from the portable terminal apparatus, the portable terminal apparatus shows in the file display area a target portion of the original file received from the image processing apparatus and stored on the portable terminal apparatus itself, which is appropriate for the user operation. That eliminates the conventional need for the image processing apparatus to generate a preview to be inserted into the file display area, which is appropriate for the user operation, and also for the portable terminal apparatus to receive that preview from the image processing apparatus, and thus the portable terminal apparatus is allowed to perform screen switching rapidly. That also eliminates the conventional need for the image processing apparatus to compress a preview to be inserted into the file display area and also for the portable terminal apparatus to decompress that preview, and thus the image quality can be prevented from being degraded by compression and decompression. Furthermore, the portable terminal apparatus obtains a target portion from the original file and shows it in the file display area, and thus user can use any file-handling function enabled on the portable terminal apparatus even when operating on a file shown in the file display area. This method would significantly improve the convenience of users.

According to the aforementioned mode [11] of the invention, even when a user operates on the file display area of the first operation screen from the portable terminal apparatus, the portable terminal apparatus performs screen switching rapidly and prevents the image quality from being degraded by compression and decompression, and users also can use any file-handling function enabled on the portable terminal apparatus.

According to the aforementioned mode [12] of the invention, the portable terminal apparatus is allowed to reproduce the first operation screen including the file display area on the basis of the file and the area reproduction information both received from the image processing apparatus.

According to the aforementioned mode [13] of the invention, the portable terminal apparatus is allowed to identify the position of the file display area with no difficulty by the coordinates.

According to the aforementioned mode [14] of the invention, the portable terminal apparatus is allowed to display a preview display screen including a file display area that shows a preview of the file page by page and identify a target page of the file by receiving page identification of the target page that is shown in the file display area, from the image processing apparatus.

According to the aforementioned mode [15] of the invention, the portable terminal apparatus is allowed to judge whether or not the user operates on the first or second operation screen with no difficulty by examining the coordinate of the position at which the user touches on the terminal display portion.

According to the aforementioned mode [16] of the invention, the portable terminal apparatus is allowed to show the target portion of the file, which is appropriate for the user operation, in the file display area whose position is defined by the first position information.

According to the aforementioned mode [17] of the invention, when the user performs flipping to the next page, zooming in, or zooming out on the file display area of the first operation screen displayed on the terminal display portion to show a different target portion in the file display area, the portable terminal apparatus transmits third position information defining the position of the different target portion in the file to the image processing apparatus.

According to the aforementioned mode [18] of the invention, when a user operates on the file display area of the first operation screen from the portable terminal apparatus, the computer of the portable terminal apparatus is allowed to show a target portion of the original file received from the image processing apparatus and stored on the portable terminal apparatus, which is appropriate for the user operation, in the file display area.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A cooperative image processing system comprising an image processing apparatus and a portable terminal apparatus being capable of accessing to each other,
the image processing apparatus comprising:
a display portion;
a screen judgment portion that judges whether an operation screen requested from the portable terminal apparatus is a first operation screen including a file display area that shows the entire or a portion of a file or a second operation screen including no file display area, when the image processing apparatus receives a request for screen data for reproducing the operation screen, from the portable terminal apparatus; and
a transmitter that transmits the screen data for reproducing the first operation screen, but excluding the file display area, to the portable terminal apparatus along with the file and area reproduction information for reproducing the file display area so that the portable terminal apparatus can reproduce the file display area on the basis of the file, if the screen judgment portion judges that the operation screen requested from the portable terminal apparatus is the first operation screen; or transmits the screen data for reproducing the second operation screen to the portable terminal apparatus, if the screen judgment portion judges that the operation screen requested from the portable terminal apparatus is the second operation screen, the portable terminal apparatus comprising:

a request transmitter that transmits a request for the screen data for reproducing the first or second operation screen to the image processing apparatus;

an operation screen reproducer that reproduces the first operation screen of the image processing apparatus on the basis of the screen data for reproducing the first operation screen and the area reproduction information for reproducing the file display area, if the portable terminal apparatus receives the screen data for reproducing the first operation screen from the image processing apparatus in return to the request; or reproduces the second operation screen of the image processing apparatus on the basis of the screen data for reproducing the second operation screen, if the portable terminal apparatus receives the screen data for reproducing the second operation screen from the image processing apparatus in return to the request;

a terminal display portion that displays the first or second operation screen reproduced by the operation screen reproducer;

a file storage that stores the file received from the image processing apparatus;

an operation judgment portion that judges whether a user operates on the first or second operation screen displayed on the terminal display portion;

a notification transmitter that transmits operation information indicating the user operation to the image processing apparatus if the operation judgment portion judges that a user operates on the second operation screen or the area other than the file display area in the first operation screen; and a display controller that allows the terminal display portion to show a target portion of the file stored on the file storage, the target portion being appropriate for the user operation, in the file display area if the operation judgment portion judges that a user operates on the file display area in the first operation screen.

2. The cooperative image processing system as recited in claim 1, wherein:

the area reproduction information includes first position information defining the position of the file display area in the first operation screen and second position information defining the position of the target portion in the file, the target portion being shown in the file display area; and the operation screen reproducer reproduces the first operation screen by showing the target portion in the file, whose position is defined by the second position information, in the file display area whose position is defined by the first position information.

3. The cooperative image processing system as recited in claim 1, wherein:

the image processing apparatus further comprises:

a file storage that stores one or more files; and a file obtaining portion that obtains the file shown in the file display area, from the file storage of the image processing apparatus, if the screen judgment portion judges that the operation screen requested from the portable terminal apparatus is the first operation screen; and the transmitter further transmits the file obtained by the file obtaining portion, to the portable terminal apparatus.

4. The cooperative image processing system as recited in claim 2, wherein the first position information is the coordinates of the file display area in the first operation screen.

5. The cooperative image processing system as recited in claim 2, wherein the first operation screen is a preview display screen including a file display area that shows a preview of the file page by page, and the second position information is page identification of a target page shown in the file display area.

6. The cooperative image processing system as recited in claim 1, wherein the operation judgment portion judges whether a user operates on the first or second operation screen by examining the coordinate of the position at which the user touches on the terminal display portion.

7. The cooperative image processing system as recited in claim 1, wherein the display controller allows the terminal display portion to show the target portion of the file, the target portion being appropriate for the user operation, in the file display area whose position is defined by the first position information.

8. The cooperative image processing system as recited in claim 1, wherein when the user performs flipping to the next page, zooming in, or zooming out on the file display area of the first operation screen displayed on the terminal display portion to show a different target portion in the file display area, third position information defining the position of the different target portion in the file is transmitted to the image processing apparatus.

9. The cooperative image processing system as recited in claim 8, wherein when receiving the third position information from the portable terminal apparatus, the image processing apparatus synchronizes the first operation screen with the portable terminal apparatus by showing the different target portion in the file display area whose position is defined by the third position information.

10. A cooperation method to be implemented by a cooperative image processing system comprising an image processing apparatus and a portable terminal apparatus being capable of accessing to each other, the cooperation method comprising:

the following steps of the image processing apparatus:

judging whether an operation screen requested from the portable terminal apparatus is a first operation screen including a file display area that shows the entire or a portion of a file or a second operation screen including no file display area, when the image processing apparatus receives a request for screen data for reproducing the operation screen, from the portable terminal apparatus; and transmitting the screen data for reproducing the first operation screen, but excluding the file display area, to the portable terminal apparatus along with the file and area reproduction information for reproducing the file display area so that the portable terminal apparatus can reproduce the file display area on the basis of the file, if the operation screen requested from the portable terminal apparatus is the first operation screen; or transmitting the screen data for reproducing the second operation screen to the portable terminal apparatus, if the operation screen requested from the portable terminal apparatus is the second operation screen; and the following steps of the portable terminal apparatus:

transmitting a request for the screen data for reproducing the first or second operation screen to the image processing apparatus;

reproducing the first operation screen of the image processing apparatus on the basis of the screen data for reproducing the first operation screen and the area reproduction information for reproducing the file display area, if the portable terminal apparatus receives in return to the request the screen data for reproducing the first operation screen from the image processing apparatus; or reproducing the second operation screen of the image processing apparatus on the basis of the screen data for reproducing the second operation screen, if the portable terminal apparatus receives in return to the request the screen data for reproducing the second operation screen from the image processing apparatus;

displaying the first or second operation screen reproduced by the operation screen reproducer, on a terminal display portion of the portable terminal apparatus;

storing the file received from the image processing apparatus;

judging whether a user operates on the first or second operation screen displayed on the terminal display portion;

transmitting operation information indicating the user operation to the image processing apparatus if a user operates on the second operation screen or the area other than the file display area in the first operation screen; and allowing the terminal display portion to show a target portion of the file stored on the file storage, the target portion being appropriate for the user operation, in the file display area if a user operates on the file display area in the first operation screen.

11. A portable terminal apparatus comprising:
an access portion that establishes an access to an image processing apparatus;
a request transmitter that transmits to the image processing apparatus to which an access has been established by the access portion, a request for screen data for reproducing a first operation screen including a file display area that shows the entire or a portion of a file or a second operation screen including no file display area;
a receiver that receives in return to the request the screen data for reproducing the first operation screen, but excluding the file display area, from the image processing apparatus along with the file and area reproduction information for reproducing the file display area so that the portable terminal apparatus can reproduce the file display area on the basis of the file; or receives in return to the request the screen data for reproducing the second operation screen from the image processing apparatus;
an operation screen reproducer that reproduces the first operation screen of the image processing apparatus on the basis of the screen data for reproducing the first operation screen and the area reproduction information for reproducing the file display area, if the receiver receives in return to the request the screen data for reproducing the first operation screen from the image processing apparatus; or reproduces the second operation screen of the image processing apparatus on the basis of the screen data for reproducing the second operation screen, if the receiver receives in return to the request the screen data for reproducing the second operation screen from the image processing apparatus;
a terminal display portion that displays the first or second operation screen reproduced by the operation screen reproducer;
a file storage that stores the file received from the image processing apparatus;
an operation judgment portion that judges whether a user operates on the first or second operation screen displayed on the terminal display portion;
a notification transmitter that transmits operation information indicating the user operation to the image processing apparatus if the operation judgment portion judges that a user operates on the second operation screen or the area other than the file display area in the first operation screen; and
a display controller that allows the terminal display portion to show a target portion of the file stored on the file storage, the target portion being appropriate for the user operation, in the file display area if the operation judgment portion judges that a user operates on the file display area in the first operation screen.

12. The portable terminal apparatus as recited in claim 11, wherein:
the area reproduction information includes first position information defining the position of the file display area in the first operation screen and second position information defining the position of the target portion in the file, the target portion being shown in the file display area; and
the operation screen reproducer reproduces the first operation screen by showing the target portion in the file, whose position is defined by the second position information, in the file display area whose position is defined by the first position information.

13. The portable terminal apparatus as recited in claim 12, wherein the first position information is the coordinates of the file display area in the first operation screen.

14. The portable terminal apparatus as recited in claim 12, wherein the first operation screen is a preview display screen including a file display area that shows a preview of the file page by page, and the second position information is page identification of a target page shown in the file display area.

15. The portable terminal apparatus as recited in claim 11, wherein the operation judgment portion judges whether a user operates on the first or second operation screen by examining the coordinate of the position at which the user touches on the terminal display portion.

16. The portable terminal apparatus as recited in claim 11, wherein the display controller allows the terminal display portion to show the target portion of the file, the target portion being appropriate for the user operation, in the file display area whose position is defined by the first position information.

17. The portable terminal apparatus as recited in claim 11, wherein when the user performs flipping to the next page, zooming in, or zooming out on the file display area of the first operation screen displayed on the terminal display portion to show a different target portion in the file display area, third position information defining the position of the different target position in the file is transmitted to the image processing apparatus.

18. A non-transitory computer-readable recording medium storing a cooperative program thereon to make a computer of a portable terminal apparatus execute:
establishing an access to an image processing apparatus;
transmitting to the image processing apparatus to which an access has been established, a request for screen data for reproducing a first operation screen including a file display area that shows the entire or a portion of a file or a second operation screen including no file display area;
receiving in return to the request the screen data for reproducing the first operation screen, but excluding the file display area, from the image processing apparatus along with the file and area reproduction information for reproducing the file display area so that the portable terminal apparatus can reproduce the file display area on the basis of the file; or receives in return to the request the screen data for reproducing the second operation screen from the image processing apparatus;

reproducing the first operation screen of the image processing apparatus on the basis of the screen data for reproducing the first operation screen and the area reproduction information for reproducing the file display area, if the screen data for reproducing the first operation screen is received in response to the request from the image processing apparatus; or reproducing the second operation screen of the image processing apparatus on the basis of the screen data for reproducing the second operation screen, if the screen data for reproducing the second operation screen is received in response to the request from the image processing apparatus;

displaying the first or second operation screen reproduced, on a terminal display portion of the portable terminal apparatus;

storing the file received from the image processing apparatus, on a file storage;

judging whether a user operates on the first or second operation screen displayed on the terminal display portion;

transmitting operation information indicating the user operation to the image processing apparatus if a user operates on the second operation screen or the area other than the file display area in the first operation screen; and allowing the terminal display portion to show a target portion of the file stored on the file storage, the target portion being appropriate for the user operation, in the file display area if a user operates on the file display area in the first operation screen.

* * * * *